US012154483B2

(12) United States Patent
Huo

(10) Patent No.: US 12,154,483 B2
(45) Date of Patent: Nov. 26, 2024

(54) DISPLAY PANEL AND DISPLAY DEVICE

(71) Applicant: TCL CHINA STAR OPTOELECTRONICS TECHNOLOGY CO., LTD., Guangdong (CN)

(72) Inventor: Wenxue Huo, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/755,515

(22) PCT Filed: Mar. 4, 2022

(86) PCT No.: PCT/CN2022/079222
§ 371 (c)(1),
(2) Date: Apr. 29, 2022

(87) PCT Pub. No.: WO2023/159669
PCT Pub. Date: Aug. 31, 2023

(65) Prior Publication Data

US 2024/0169891 A1 May 23, 2024

(30) Foreign Application Priority Data

Feb. 24, 2022 (CN) ......................... 202210172376.5

(51) Int. Cl.
*G09G 3/32* (2016.01)

(52) U.S. Cl.
CPC ....... *G09G 3/32* (2013.01); *G09G 2320/0233* (2013.01)

(58) Field of Classification Search
CPC .......... G09G 3/3233; G09G 3/36; G09G 3/20; G09G 3/3696; G09G 3/3607; G09G 3/296;
(Continued)

(56) References Cited

U.S. PATENT DOCUMENTS

2013/0088416 A1 4/2013 Smith et al.
2014/0313109 A1 10/2014 Ono
(Continued)

FOREIGN PATENT DOCUMENTS

CN 103927977 A 7/2014
CN 110649059 A 1/2020
(Continued)

OTHER PUBLICATIONS

International Search Report in International application No. PCT/CN2022/079222, mailed on Nov. 22, 2022.
(Continued)

*Primary Examiner* — Dong Hui Liang
(74) *Attorney, Agent, or Firm* — PV IP PC; Wei Te Chung

(57) ABSTRACT

A display panel and a display device are disclosed. The display panel includes M columns of pixel circuits, M negative power supply lines, and M positive power supply lines. A negative power supply line and a positive power supply line are respectively arranged on both sides of a column of pixel circuits. An input end of the negative power supply line is arranged opposite to an input end of the positive power supply line. A voltage in the positive power supply line gradually decreases, and a voltage in the negative power supply line gradually increases. This reduces differences in power supply voltages delivered to each pixel circuit.

17 Claims, 4 Drawing Sheets

(58) Field of Classification Search
CPC ............... G09G 3/3655; G09G 3/3225; G09G 2320/0233; G09G 2320/0247; G09G 2330/021; G09G 2300/0809; G09G 2300/0842
See application file for complete search history.

(56) References Cited

U.S. PATENT DOCUMENTS

| | | | | |
|---|---|---|---|---|
| 2014/0354701 | A1 | 12/2014 | Yeo | |
| 2017/0186372 | A1 | 6/2017 | Yanase et al. | |
| 2024/0030392 | A1* | 1/2024 | Xu | G09G 3/32 |

FOREIGN PATENT DOCUMENTS

| | | | |
|---|---|---|---|
| CN | 111696488 | A | 9/2020 |
| CN | 112201165 | A | 1/2021 |
| CN | 112509476 | A | 3/2021 |
| CN | 112767880 | A | 5/2021 |
| CN | 113241038 | A | 8/2021 |
| CN | 215182984 | U | 12/2021 |
| IN | 108364982 | A | 8/2018 |
| WO | 2021168738 | A1 | 9/2021 |

OTHER PUBLICATIONS

Written Opinion of the International Search Authority in International application No. PCT/CN2022/079222, mailed on Nov. 22, 2022.

Chinese Office Action issued in corresponding Chinese Patent Application No. 202210172376.5 dated Nov. 1, 2022, pp. 1-9.

* cited by examiner

DISPLAY PANEL AND DISPLAY DEVICE

FIELD OF INVENTION

The present application relates to the field of display technologies, and more particularly to a display panel and a display device.

BACKGROUND OF INVENTION

Self-luminous pixel circuits usually require positive power supply lines and negative power supply lines to provide power to achieve normal display functions. However, there is a voltage difference between the positive power supply line and the negative power supply line due to their own losses during power transmission. This results in a large difference in power supply voltages transmitted to each pixel circuit, which in turn results in different luminous brightness of each pixel circuit, which reduces display quality.

It should be noted that the above description of the background technology is only for facilitating a clear and complete understanding of the technical solutions of the present application. Therefore, it should not be considered that the above-mentioned technical solutions are known to those skilled in the art just because they appear in the background art of the present application.

Technical Problem

The present application provides a display panel and a display device to alleviate the technical problem of large differences in power supply voltages transmitted to pixel circuits in the same column.

SUMMARY OF INVENTION

In a first aspect, the present application provides a display panel, which includes M columns of pixel circuits, wherein the M columns of pixel circuits are arranged in sequence along a first direction, each column of the pixel circuits comprises a plurality of pixel circuits arranged in sequence along a second direction, and M is a positive integer; M negative power supply lines, wherein the M negative power supply lines are arranged in sequence along the first direction, an Nth negative power supply line is located on one side of an Nth column of pixel circuits in the first direction, the Nth negative power supply line is electrically connected to each pixel circuit in the Nth column of pixel circuits, and N is a positive integer less than or equal to M; and M positive power supply lines, wherein the M positive power supply lines are arranged in sequence along the first direction, an Nth positive power supply line is located on another side of the Nth column of pixel circuits in the first direction, the Nth positive power supply line is electrically connected to each pixel circuit in the Nth column of pixel circuits; wherein an input end of the Nth negative power supply line is arranged opposite to an input end of the Nth positive power supply line.

In some embodiments, the display panel is provided with a first area, a second area, and a third area distributed in sequence along the second direction, one of the input end of the Nth negative power supply line or the input end of the Nth positive power supply line is located in the first area, another of the input end of the Nth negative power supply line and the input end of the Nth positive power supply line is located in the third area, and the M columns of pixel circuits are located in the second area.

In some embodiments, the Nth negative power supply line, the Nth column of pixel circuits, and the Nth positive power supply line are sequentially arranged along the first direction, or the Nth positive power supply line, the Nth column of pixel circuits, and the Nth negative power supply line are sequentially arranged along the first direction.

In some embodiments, transmission path lengths from the input end of the Nth negative power supply line and the input end of the Nth positive power supply line to any pixel circuit in the Nth column of pixel circuits are equal.

In some embodiments, an N−1th negative power supply line is located on one side of an N−1th column of the pixel circuits in the first direction, and the N−1th negative power supply line is electrically connected to each pixel circuit in the N−1th column of pixel circuits, and N is an even number; an N−1th positive power supply line is located on another side of the N−1th column of pixel circuits in the first direction, the N−1th positive power supply line is electrically connected to each pixel circuit in the N−1th column of pixel circuits; wherein an input end of the N−1th negative power supply line is arranged on a same side as an input end of the N−1th positive power supply line.

In some embodiments, an N+1th negative power supply line is located on one side of an N+1th column of pixel circuits in the first direction, the N+1th negative power supply line is electrically connected to each pixel circuit in the N+1th column of pixel circuits, where N+1 is less than or equal to M and N is odd; an N+1th positive power supply line is located on another side of the N+1th column of pixel circuits in the first direction, the N+1th positive power supply line is electrically connected to each pixel circuit in the N+1th column of pixel circuits; wherein an input end of the N+1th negative power supply line is arranged on a same side as an input end of the N+1th positive power supply line.

In some embodiments, the display panel is provided with a first area, a second area, and a third area distributed in sequence along the second direction, the input end of the N+1th negative power supply line and the input end of the N+1th positive power supply line are both located in the first area or the third area; the M columns of pixel circuits are located in the second area.

In some embodiments, the N+1th negative power supply line, the N+1th column of pixel circuits, and the N+1th positive power supply line are sequentially arranged along the first direction, or the N+1th positive power supply line, the N+1th column of pixel circuits, and the N+1th negative power supply line are sequentially arranged along the first direction.

In some embodiments, transmission path lengths from the input end of the N+1th negative power supply line and the input end of the N+1th positive power supply line to any pixel circuit in the N+1th column of pixel circuits are equal.

In some embodiments, the Nth negative power supply line, the Nth column of pixel circuits, the Nth positive power supply line, the N+1th negative power supply line, the N+1th column of pixel circuits, and the N+1th positive power supply line are sequentially arranged along the first direction.

In a second aspect, the present application provides a display device, which includes the display panel in at least one of the above-mentioned embodiments, wherein at least one of the M negative power supply lines is configured to transmit a power supply negative signal, and at least one of the M positive power supply lines is configured to transmit a power supply positive signal.

Beneficial Effect

In the display panel and the display device provided by the present application, a negative power supply line and a positive power supply line are respectively arranged on both sides of a column of pixel circuits. The input end of the negative power supply line is arranged opposite to the input end of the positive power supply line, which can gradually reduce a voltage in the positive power supply line and gradually increase a voltage in the negative power supply line. Further, the difference of power supply voltages transmitted to the pixel circuits in the same column is reduced or eliminated, and a brightness uniformity of the display can be improved.

DETAILED DESCRIPTION OF PREFERRED EMBODIMENTS

Figure 1:
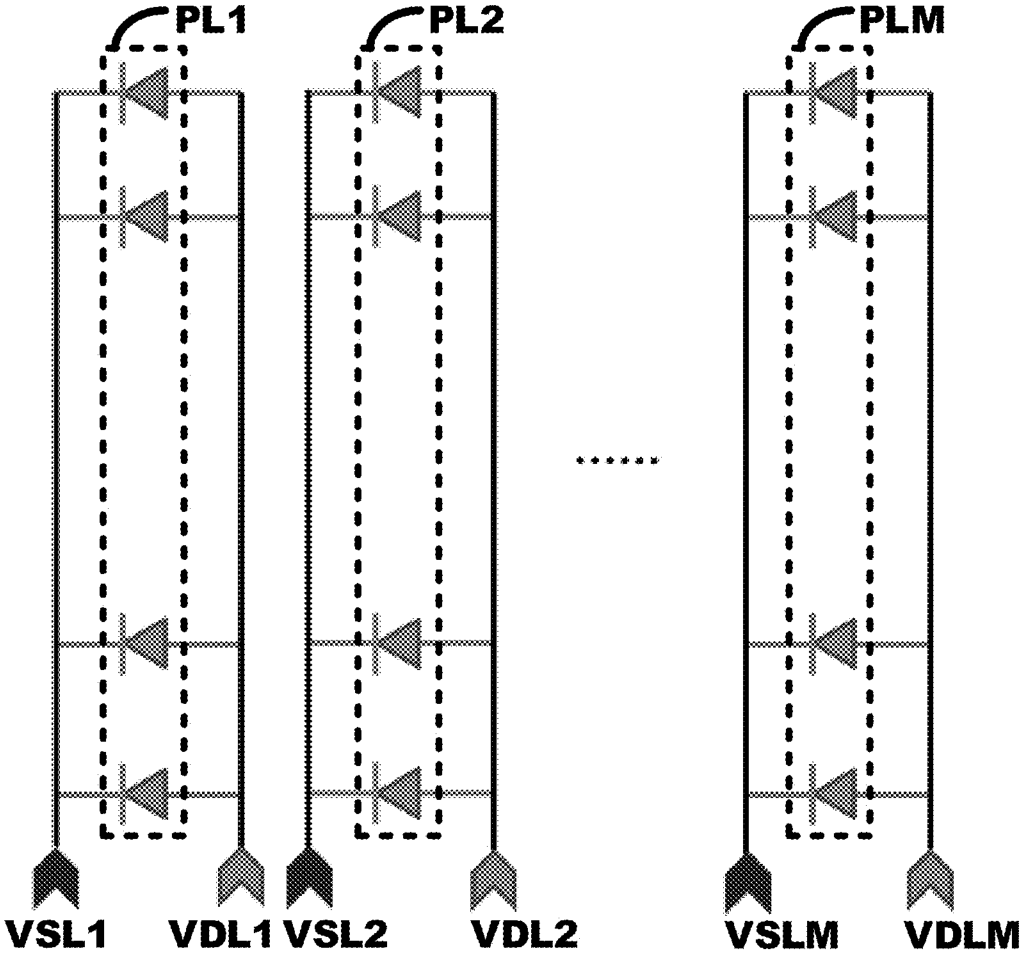
FIG. 1 Prior Art
FIG. 1 is a schematic structural diagram of a display panel in the related art.

In order to make the objectives, technical solutions, and effects of the present application clearer, the present application will be further described in detail below with reference to the accompanying drawings and examples. It should be understood that the specific embodiments described herein are only used to explain the present application, but not to limit the present application.

In the description of the present application, it should be understood that the orientation or positional relationship indicated by terms "center", "longitudinal", "lateral", "length", "width", "thickness", "upper", "lower", "front", "back", "left", "right", "vertical", "horizontal", "top", "bottom", "inside", "outside", "clockwise", "counterclockwise" and the like is based on the orientation or positional relationship shown in the accompanying drawings. This is only for ease of describing the application and to simplify the description. It is not indicated or implied that the referred device or element must have a particular orientation, be constructed and operate in a particular orientation. Therefore, it should not be construed as a limitation on this application. In addition, the terms "first" and "second" are only used for descriptive purposes, and should not be construed as indicating or implying relative importance or implying the number of indicated technical features. Thus, features defined as "first", "second" may expressly or implicitly include one or more of said features. In the description of this application, "plurality" means two or more, unless expressly and specifically defined otherwise.

In the description of the present disclosure, it should be noted that the terms "installed", "linked" and "connected" should be construed in a broad sense unless otherwise expressly specified and limited. For example, it may be a fixed connection, a detachable connection, or an integral connection. It can be a mechanical connection or an electrical connection or can communicate with each other. It can be directly connected or indirectly connected through an intermediate medium, and it can be the connection between two components or the interaction between the two components. For those of ordinary skill in the art, the specific meanings of the above terms in the present disclosure can be understood according to specific situations.

In the present disclosure, unless otherwise expressly specified and limited, a first feature "on" or "under" a second feature may include that the first feature and the second feature are in direct contact, or may include that the first feature and the second feature are not in direct contact but through a third feature outside of them. Also, the first feature being "above", "over" and "on" the second feature includes that the first feature being directly above and obliquely above the second feature, or simply means that the first feature is at a higher level than the second feature. The first feature is "below", "under" and "underneath" the second feature includes that the first feature is directly and diagonally below the second feature, or simply means that the first feature has a lower level than the second feature.

FIG. 1 is a schematic structural diagram of a display panel in the related art. The display panel includes M columns of pixel circuits, where M can be a positive integer, such as column pixel circuits PL1, column pixel circuits PL2 . . . and column pixel circuits PLM. Each column of pixel circuits includes a plurality of pixel circuits. It should be noted that, in this embodiment, each pixel circuit is characterized as a diode symbol as shown in FIG. 1.

The display panel shown in FIG. 1 further includes M negative power supply lines, such as negative power supply line VSL1, negative power supply line VSL2 . . . and negative power supply line VSLM. Each negative power line is electrically connected to a pixel circuit of a corresponding column to transmit a negative power supply signal to the pixel circuit of the corresponding column. The arrow near VSL1 in FIG. 1 is used to represent the input end of the negative power supply line VSL1. It can be understood that, as the power supply negative signal is connected from the input end of the negative power supply line VSL1 and is transmitted or transmitted in the direction indicated by the arrow, due to the resistance of the negative power supply line VSL1 itself, the power supply is negative, and potential of the power supply negative signal is gradually raised.

The display panel shown in FIG. 1 further includes M positive power supply lines, such as positive power line VDL1, positive power line VDL2 . . . and positive power line VDLM. Each positive power supply line is electrically connected to a pixel circuit in a corresponding column to transmit a positive power supply signal to the pixel circuit in a corresponding column. The arrows close to VDL1 in FIG. 1 are used to represent the input end of the positive power supply line VDL1. It can be understood that, when the positive power supply signal is connected from the input end of the positive power supply line VDL1 and is transmitted or transmitted in the direction indicated by the arrow, due to the resistance of the positive power supply line VDL1 itself, the potential of the power supply positive signal is gradually pulled down.

On the other hand, each column of pixel circuits in FIG. 1 is respectively configured with a negative power supply line and a positive power supply line, such as a negative power supply line VSLM and a positive power supply line VDLM are configured on one side of the pixel circuit PLM of the M columns. The input end of the negative power supply line VSLM and the input end of the positive power supply line VDLM are located at the same end of the pixel circuit, for example, both are located below the pixel circuit. In this way, as the negative power supply signal is gradually raised and the positive power supply signal is gradually pulled down, the voltage difference between the positive power supply signal and the negative power supply signal transmitted to the same pixel circuit is gradually changing, e.g., gradually decreasing. This makes the input end of the negative power supply line and/or the input end of the positive power supply line farther and farther apart with distance. Under the condition that other influences on a luminous brightness of the pixel circuit remain unchanged, the luminous brightness of each column of pixel circuits is gradually decreasing. As a result, a brightness of the entire display panel is different, which affects the display quality.

Figure 2:
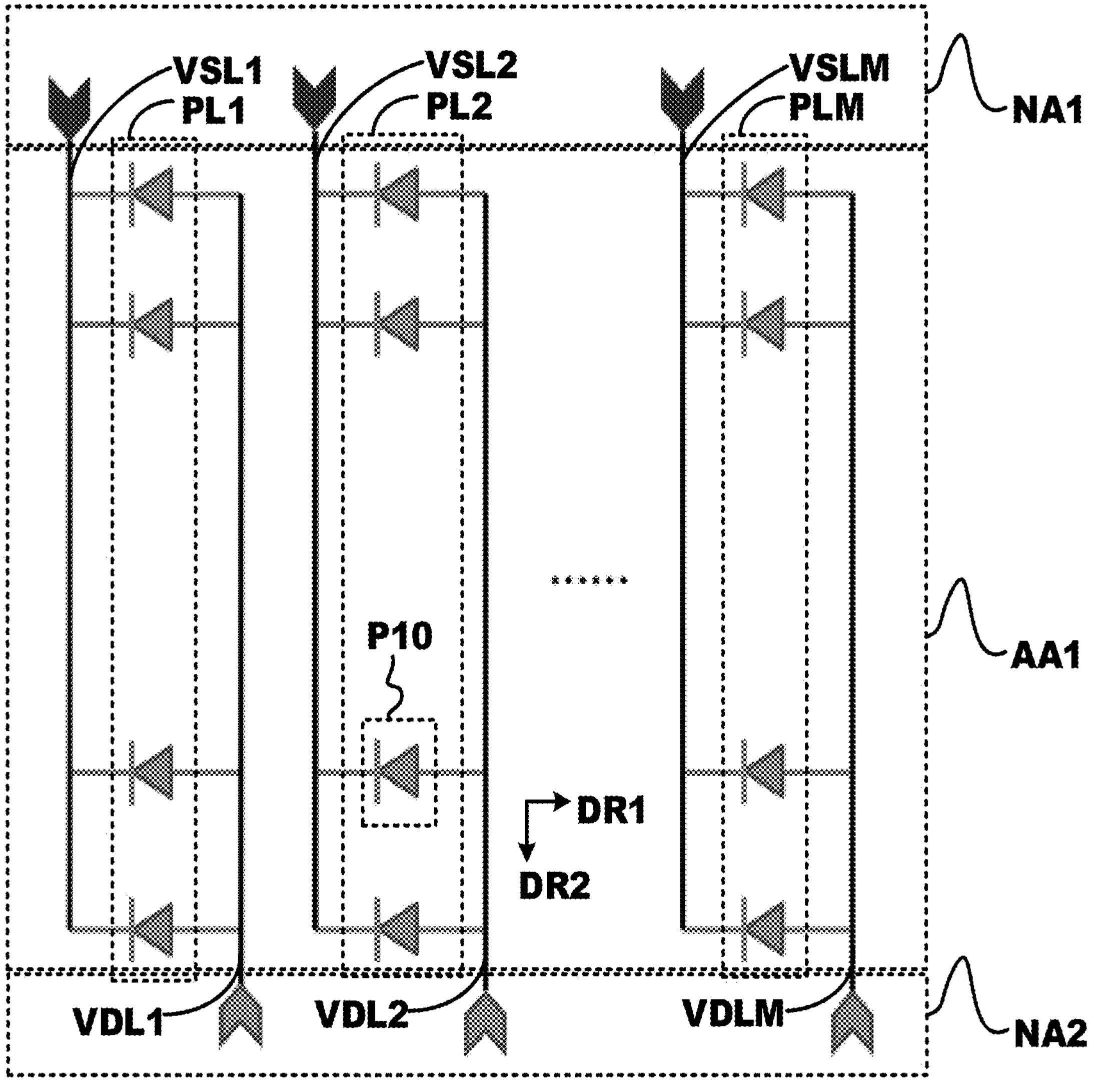
FIG. 2 is a schematic structural diagram of a display panel according to an embodiment of the present application.
Figure 3:
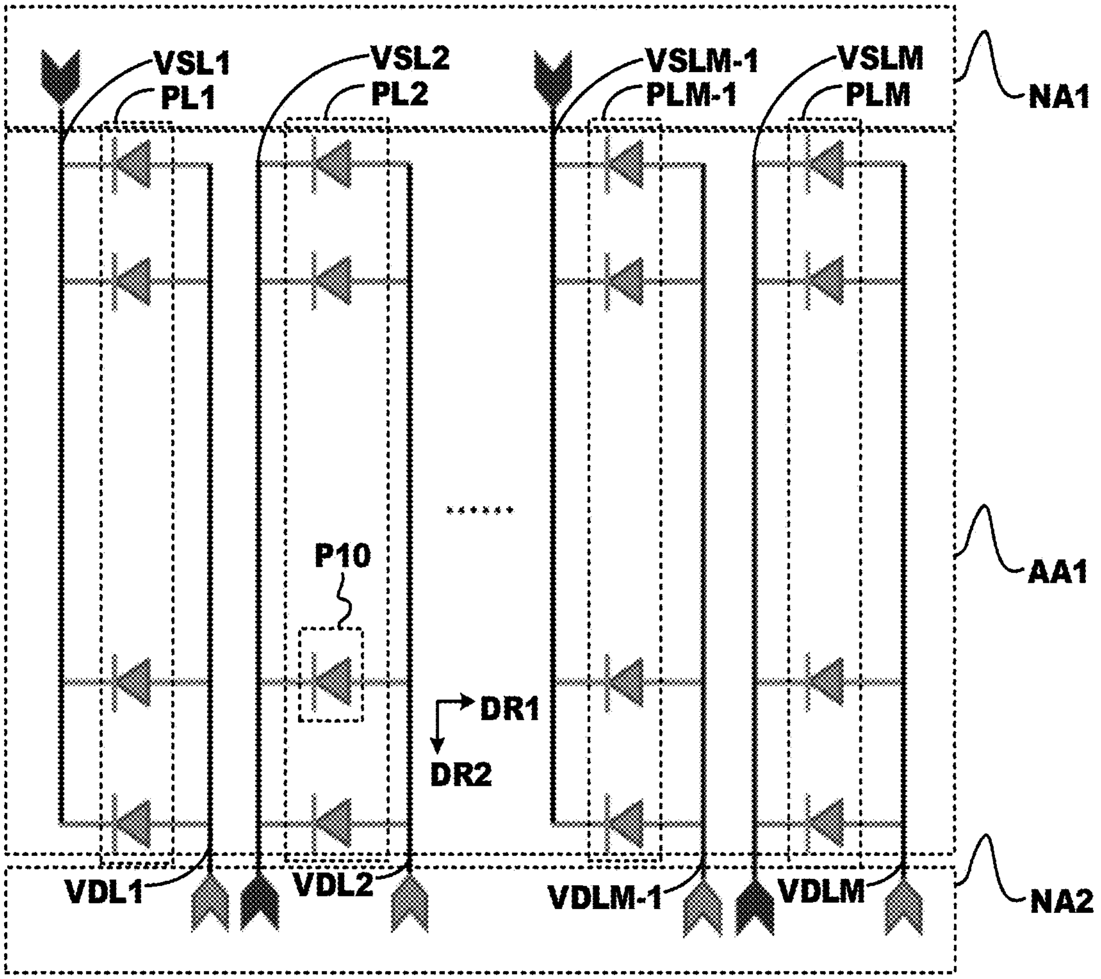
FIG. 3 is another schematic structural diagram of a display panel according to an embodiment of the present application.

In view of the defects in FIG. 1, this embodiment provides a display panel. As shown in FIG. 2 or FIG. 3, the display panel includes M columns of pixel circuits, such as column pixel circuits PL1, column pixel circuits PL2 . . . and column pixel circuits PLM. M columns of pixel circuits are sequentially arranged along the first direction DR1. Each column of pixel circuits includes a plurality of pixel circuits sequentially arranged along the second direction DR2. For example, the column pixel circuit PL2 includes a plurality of pixel circuits P10 sequentially arranged along the second direction DR2, where M is a positive integer. For example, when M is equal to 1, the display panel includes only the column pixel circuit PL1. When M is equal to 2, the display panel includes a column pixel circuit PL1 and a column pixel circuit PL2. It can be understood that M can also be other positive integers such as 3, 4, or 5.

In one embodiment, the display panel shown in FIG. 2 or FIG. 3 may further include M negative power supply lines, such as negative power supply lines VSL1, negative power supply lines VSL2 . . . and negative power supply lines VSLM. The M negative power supply lines are sequentially arranged along the first direction DR1. The Nth negative power supply line is located on one side of the Nth column of pixel circuits in the first direction DR1. The Nth negative power supply line is electrically connected to each pixel circuit in the Nth column of pixel circuits, where N is a positive integer less than or equal to M. For example, the negative power supply line VSL1 is located on the left side of the column pixel circuit PL1 in the first direction DR1, and the negative power supply line VSL1 is electrically connected to each pixel circuit in the column pixel circuit PL1.

It should be noted that, in this embodiment, the negative power supply line VSL1 is not limited to be located on the left side of the column pixel circuit PL1 in the first direction DR1. It can be understood that the negative power supply line VSL1 may also be located on the right side of the column pixel circuit PL1 in the first direction DR1.

In one embodiment, the display panel shown in FIG. 2 or FIG. 3 may further include M positive power supply lines, such as positive power supply lines VDL1, positive power supply lines VDL2 . . . and positive power supply lines VDLM. The M positive power supply lines are arranged in sequence along the first direction DR1. The Nth positive power supply line is located on the other side of the Nth column of pixel circuits in the first direction DR1. The Nth positive power supply line is electrically connected to each pixel circuit in the Nth column of pixel circuits. For example, the positive power supply line VDL1 is located on the right side of the column pixel circuit PL1 in the first direction DR1, and the positive power supply line VDL1 is electrically connected to each pixel circuit in the column pixel circuit PL1.

It should be noted that, in this embodiment, the positive power supply line VDL1 is not limited to be located on the right side of the column pixel circuit PL1 in the first direction DR1. It can be understood that the positive power supply line VDL1 may also be located on the left side of the column pixel circuit PL1 in the first direction DR1. It is only necessary to avoid the situation where the positive power supply line VDL1 and the negative power supply line VSL1 are located on the same side of the column pixel circuit PL1.

In one embodiment, in the display panel shown in FIG. 2 or FIG. 3, the input end of the Nth negative power supply line is arranged opposite to the input end of the Nth positive power supply line. For example, the input end of the negative power supply line VSL1 is located above the pixel circuit in the second direction DR2, and may specifically be the upper border area of the display panel. The input end of the positive power supply line VDL1 is located below the pixel circuit in the second direction DR2, and may specifically be the lower border area of the display panel.

It should be noted that the input end of the negative power supply line VSL1 is located below the pixel circuit in the second direction DR2, and may specifically be the lower border area of the display panel. The input end of the positive power supply line VDL1 is located above the pixel circuit in the second direction DR2, and may specifically be the upper border area of the display panel.

It can be understood that, in the display panel provided in this embodiment, a negative power supply line and a positive power supply line are respectively arranged on both sides of a column of pixel circuits. The input end of the negative power supply line is arranged opposite to the input end of the positive power supply line. For example, each column pixel circuit in the display panel shown in FIG. 2 is configured in this way. However, in the display panel shown in FIG. 3, only odd-numbered column pixel circuits or even-numbered column pixel circuits are configured in this way. It can be understood that, they both can gradually reduce the voltage in the positive power supply line and gradually increase the voltage in the negative power supply line. This in turn reduces or eliminates differences in power supply voltages delivered to pixel circuits in the same column. This can improve a brightness uniformity of the display. The power supply voltage may be the voltage difference between the power supply positive signal and the power supply negative signal.

In one embodiment, the display panel is provided with a first area NA1, a second area AA1, and a third area NA2 distributed in sequence along the second direction DR2. One of the input end of the Nth negative power supply line or the input end of the Nth positive power supply line is located in the first area NA1. The other one of the input end of the Nth negative power supply line or the input end of the Nth positive power supply line is located in the third area NA2, and the pixel circuits of the M columns are located in the second area AA1.

It should be noted that the first area NA1 may be one of the upper border area or the lower border area of the display panel, and the third area NA2 may be the other of the upper border area or the lower border area of the display panel. Alternatively, the first area NA1 may also be one of the left border area or the right border area of the display panel, and the third area NA2 may also be the other one of the left border area or the right border area of the display panel. It can be understood that, in this way, the input end of the negative power supply line and the input end of the positive power supply line that are electrically connected to the same column of pixel circuits can be configured to be disposed on opposite sides.

In one embodiment, the Nth negative power supply line, the Nth column of pixel circuits, and the Nth positive power supply line are sequentially arranged along the first direction DR1. Alternatively, the Nth positive power supply line, the Nth column of pixel circuits, and the Nth negative power supply line are sequentially arranged along the first direction DR1.

For example, the negative power supply line VSL1, the column pixel circuit PL1, and the positive power supply line VDL1 are sequentially arranged along the first direction DR1. Alternatively, the positive power supply line VDL1, the column pixel circuit PL1, and the negative power supply line VSL1 are sequentially arranged along the first direction DR1. It can be understood that, it can be ensured that the negative power supply line VSL1 and the positive power supply line VDL1 are located on both sides of the column pixel circuit PL1 in the first direction DR1, respectively. This facilitates extended routing of the negative power supply lines and the positive power supply lines to corresponding column pixel circuits without the occurrence of cross or overlap of the negative power supply lines and the positive power supply lines in the thickness direction of the display panel.

In one of the embodiments, the N−1th negative power supply line is located on one side of the N−1th column of pixel circuits in the first direction. The N−1th negative power supply line is electrically connected to each pixel circuit in the N−1th column of pixel circuits, and N is an even number. The N−1th positive power supply line is located on the other side of the pixel circuit in the N−1th column in the first direction. The N−1th positive power supply line is electrically connected to each pixel circuit in the N−1th column of pixel circuits. The input end of the N−1th negative power supply line is disposed on the same side as the input end of the N−1th positive power supply line.

In one embodiment, as shown in FIG. 3, the N+1th negative power supply line is located on one side of the N+1th column of pixel circuits in the first direction DR1. The N+1th negative power supply line is electrically connected to each pixel circuit in the N+1th column of pixel circuits, where N+1 is less than or equal to M and N is an odd number. The N+1th positive power supply line is located on the other side of the N+1th column of pixel circuits in the first direction DR1. The N+1th positive power supply line is electrically connected to each pixel circuit in the N+1th column of pixel circuits. The input end of the N+1th negative power supply line is arranged on the same side as the input end of the N+1th positive power supply line.

For example, the input end of the negative power supply line VSLM-1 electrically connected to the column pixel circuit PLM-1 is located above the pixel circuit in the second direction DR2. The input end of the negative power supply line VSLM electrically connected to the column pixel circuit PLM is located below the pixel circuit in the second direction DR2. The input end of the positive power supply line VDLM-1 electrically connected to the column pixel circuit PLM-1 and the input end of the positive power supply line VDLM electrically connected to the column pixel circuit PLM are all located below the pixel circuit in the second direction DR2.

It should be noted that, in this embodiment, compared with the display panel shown in FIG. 1, for every other column of pixel circuits, adjust the input end of the negative power supply line to be opposite to the input end of the corresponding positive power supply line. This can make the attenuation ability of the potential of the power supply negative signal transmitted to the adjacent two columns of pixel circuits opposite. This can reduce the difference in current and brightness caused by the large potential difference of the power supply negative signals between the pixel circuits in the entire display panel, thereby improving the uniformity of the brightness of the display panel.

It can be understood that, compared with the display panel shown in FIG. 2, the display panel shown in FIG. 3 only adjusts the setting positions of the input ends of part of the negative power supply lines, and not all the display panels shown in FIG. 2 are adjusted. The setting position of the input end of the negative power supply line can improve the brightness uniformity of the display panel with minor changes.

In one embodiment, as shown in FIG. 3, the display panel is provided with a first area NA1, a second area AA1, and a third area NA2 distributed in sequence along the second direction DR2. The input end of the N+1th negative power supply line and the input end of the N+1th positive power supply line are both located in the first area NA1 or the third area NA2. M columns of pixel circuits are located in the second area AA1.

In one embodiment, as shown in FIG. 3, the N+1th negative power supply line, the N+1th column of pixel circuits, and the N+1th positive power supply line are sequentially arranged along the first direction DR1. Alternatively, the N+1th positive power supply line, the N+1th column of pixel circuits, and the N+1th negative power supply line are sequentially arranged along the first direction DR1.

In one embodiment, transmission path lengths from the input end of the N+1th negative power supply line and the input end of the N+1th positive power supply line to any pixel circuit in the N+1th column of pixel circuits are respectively equal.

In one embodiment, the Nth negative power supply line, the Nth column of pixel circuits, the Nth positive power supply line, the N+1th negative power supply line, the N+1th column of pixel circuits, and the N+1th positive power supply line is sequentially arranged along the first direction DR1.

It should be noted that the Nth negative power supply line in the above embodiment may be, but is not limited to, the negative power supply line VSL1. The Nth positive power supply line may be, but is not limited to, the positive power supply line VDL1. Correspondingly, the N+1th negative power supply line may be the negative power supply line VSL2, and the N+1th positive power supply line may be the positive power supply line VDL2. Alternatively, the Nth negative power supply line may be, but is not limited to, the negative power supply line VSLM-1, and the Nth positive power supply line may be, but not limited to, the positive power supply line VDLM-1. Correspondingly, the N+1th negative power supply line may be the negative power supply line VSLM, and the N+1th positive power supply line may be the positive power supply line VDLM.

Figure 4:
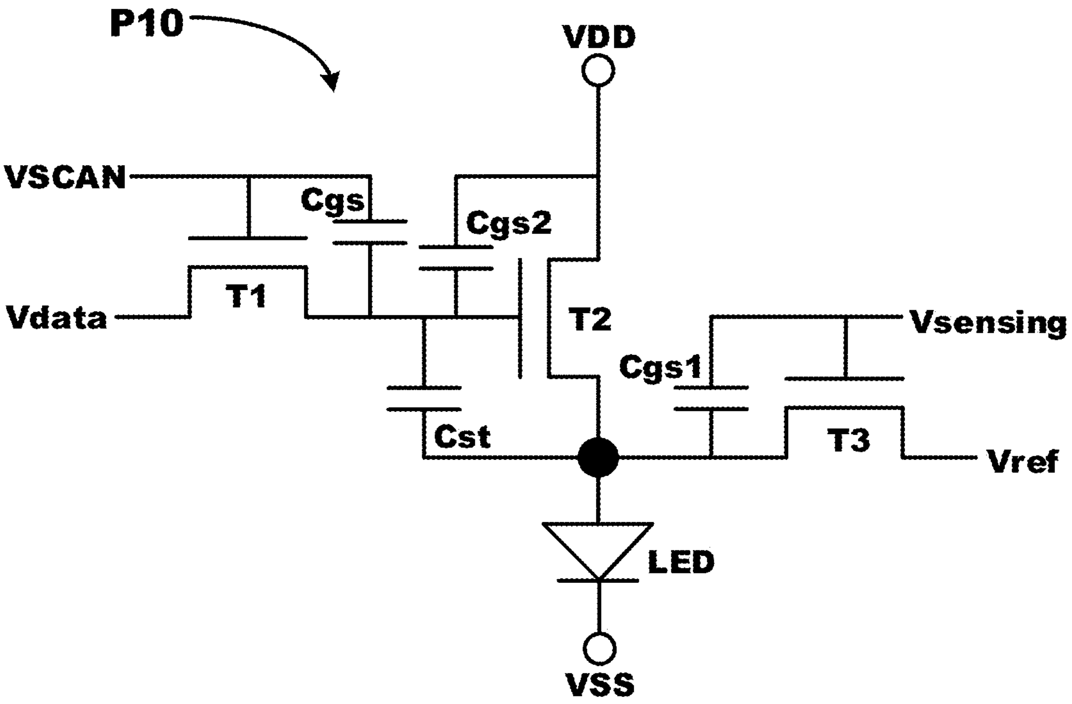
FIG. 4 is a schematic structural diagram of the pixel circuit shown in FIG. 2 or FIG. 3.

In one of the embodiments, the structure of any pixel circuit P10 in FIG. 1 to FIG. 3 may be as shown in FIG. 4. The pixel circuit P10 may include a transistor T1, a driving transistor T2, a transistor T3, a storage capacitor Cst, and a light emitting device LED. One of the source/drain of the driving transistor T2 is connected to the power supply positive signal VDD transmitted by the positive power supply line. The other one of the source/drain of the driving transistor T2 is electrically connected to one end of the storage capacitor Cst, one of the source/drain of the transistor T3, and the anode of the light emitting device LED. The other of the source/drain of the transistor T3 is connected to the reference voltage signal Vref. The gate of the transistor T3 is connected to the sensing control signal Vsensing. The cathode of the light emitting device LED is connected to the power supply negative signal VSS transmitted by the negative power supply line. The gate of the driving transistor T2 is electrically connected to the other end of the storage capacitor Cst and one of the source/drain of the transistor T1. The other of the source/drain of the transistor T1 is connected to the data signal Vdata. The gate of the transistor T1 is connected to the scan signal VSCAN.

Based on the description shown in FIG. 4, it can be known that the voltage difference between the power supply positive signal VDD and the power supply negative signal VSS will affect the current flowing through the driving transistor T2. The current will further affect the light emitting brightness of the light emitting device LED. Therefore, in order to improve the brightness uniformity of the display panel, it is necessary to control the transmission path of the power supply positive signal VDD and/or the power supply negative signal VSS to each pixel circuit according to the technical solutions shown in FIG. 2 and/or FIG. 3 to reduce or eliminate differences in power supply voltages delivered to different pixel circuits.

In one of the embodiments, the pixel circuit P10 shown in FIG. 4 may further include at least one of a parasitic capacitance Cgs, a parasitic capacitance Cgs1, and a parasitic capacitance Cgs2. It can be understood that the three parasitic capacitances are all parasitic capacitances generated by the gate and drain or source of the corresponding transistor.

The light emitting device LED may be any one of a sub-millimeter light emitting diode, a micro light emitting diode, and an organic light emitting diode.

In one of the embodiments, this embodiment provides a display device, which includes the display panel in at least one of the above embodiments, at least one of the M negative power supply lines is used to transmit a negative power supply signal, and at least one of the M positive power supply lines is used to transmit the power supply positive signal.

It can be understood that, in the display device provided in this embodiment, a negative power supply line and a positive power supply line are respectively arranged on both sides of a column of pixel circuits. The input end of the negative power supply line is arranged opposite to the input end of the positive power supply line. This allows the voltage in the positive power supply line to gradually decrease and the voltage in the negative power supply line to gradually increase. Further, the difference of the power supply voltages transmitted to the pixel circuits in the same column is reduced or eliminated, and the brightness uniformity of the display can be improved.

The above-mentioned display panel may be, but is not limited to, a direct display panel constructed of sub-millimeter light emitting diodes.

It should be noted that, in the prior art, the problem of difference in power supply voltage is usually solved by thickening and/or thickening at least one of the positive power supply line and the negative power supply line. However, this solution is limited by the process capability and layout space, the complexity and difficulty of improvement are relatively high, and the improvement effect needs to be further improved.

It can be understood that, for those of ordinary skill in the art, equivalent replacements or changes can be made according to the technical solutions and inventive concepts of the present application. And all these changes or substitutions should belong to the protection scope of the appended claims of this application.

What is claimed is:

1. A display device, comprising a display panel, wherein the display panel comprises:

M columns of pixel circuits, wherein the M columns of pixel circuits are arranged in sequence along a first direction, each column of the pixel circuits comprises a plurality of pixel circuits arranged in sequence along a second direction, and M is a positive integer;

M negative power supply lines, wherein the M negative power supply lines are arranged in sequence along the first direction, an Nth negative power supply line is located on one side of an Nth column of pixel circuits in the first direction, the Nth negative power supply line is electrically connected to each pixel circuit in the Nth column of pixel circuits, and N is a positive integer less than or equal to M; and M positive power supply lines, wherein the M positive power supply lines are arranged in sequence along the first direction, an Nth positive power supply line is located on another side of the Nth column of pixel circuits in the first direction, the Nth positive power supply line is electrically connected to each pixel circuit in the Nth column of pixel circuits;

wherein an input end of the Nth negative power supply line is arranged opposite to an input end of the Nth positive power supply line;

wherein at least one of the M negative power supply lines is configured to transmit a power supply negative signal, and at least one of the M positive power supply lines is configured to transmit a power supply positive signal;

wherein an N+1th negative power supply line is located on one side of an N+1th column of pixel circuits in the first direction, the N+1th negative power supply line is electrically connected to each pixel circuit in the N+1th column of pixel circuits, where N+1 is less than or equal to M and Nis odd;

an N+1th positive power supply line is located on another side of the N+1th column of pixel circuits in the first direction, the N+1th positive power supply line is electrically connected to each pixel circuit in the N+1th column of pixel circuits;

wherein an input end of the N+1th negative power supply line is arranged on a same side as an input end of the N+1th positive power supply line.

2. The display device according to claim 1, wherein the display panel is provided with a first area, a second area, and a third area distributed in sequence along the second direction, one of the input end of the Nth negative power supply line or the input end of the Nth positive power supply line is located in the first area, another of the input end of the Nth negative power supply line and the input end of the Nth positive power supply line is located in the third area, and the M columns of pixel circuits are located in the second area.

3. The display device according to claim 2, wherein the Nth negative power supply line, the Nth column of pixel circuits, and the Nth positive power supply line are sequentially arranged along the first direction, or the Nth positive power supply line, the Nth column of pixel circuits, and the Nth negative power supply line are sequentially arranged along the first direction.

4. The display device according to claim 3, wherein transmission path lengths from the input end of the Nth negative power supply line and the input end of the Nth positive power supply line to any pixel circuit in the Nth column of pixel circuits are equal.

5. The display device according to claim 1, wherein the display panel is provided with a first area, a second area, and a third area distributed in sequence along the second direction, the input end of the N+1th negative power supply line and the input end of the N+1th positive power supply line are both located in the first area or the third area; the M columns of pixel circuits are located in the second area.

6. The display device according to claim 5, wherein the N+1th negative power supply line, the N+1th column of pixel circuits, and the N+1th positive power supply line are sequentially arranged along the first direction, or the N+1th positive power supply line, the N+1th column of pixel circuits, and the N+1th negative power supply line are sequentially arranged along the first direction.

7. The display device according to claim 6, wherein transmission path lengths from the input end of the N+1th negative power supply line and the input end of the N+1th positive power supply line to any pixel circuit in the N+1th column of pixel circuits are equal.

8. The display device according to claim 1, wherein the Nth negative power supply line, the Nth column of pixel circuits, the Nth positive power supply line, the N+1th negative power supply line, the N+1th column of pixel circuits, and the N+1th positive power supply line are sequentially arranged along the first direction.

9. A display panel, comprising:

M columns of pixel circuits, wherein the M columns of pixel circuits are arranged in sequence along a first direction, each column of the pixel circuits comprises a plurality of pixel circuits arranged in sequence along a second direction, and M is a positive integer;

M negative power supply lines, wherein the M negative power supply lines are arranged in sequence along the first direction, an Nth negative power supply line is located on one side of an Nth column of pixel circuits in the first direction, the Nth negative power supply line is electrically connected to each pixel circuit in the Nth column of pixel circuits, and N is a positive integer less than or equal to M; and M positive power supply lines, wherein the M positive power supply lines are arranged in sequence along the first direction, an Nth positive power supply line is located on another side of the Nth column of pixel circuits in the first direction, the Nth positive power supply line is electrically connected to each pixel circuit in the Nth column of pixel circuits;

wherein an input end of the Nth negative power supply line is arranged opposite to an input end of the Nth positive power supply line;

wherein an N+1th negative power supply line is located on one side of an N+1th column of pixel circuits in the first direction, the N+1th negative power supply line is electrically connected to each pixel circuit in the N+1th column of pixel circuits, where N+1 is less than or equal to M and Nis odd;

an N+1th positive power supply line is located on another side of the N+1th column of pixel circuits in the first direction, the N+1th positive power supply line is electrically connected to each pixel circuit in the N+1th column of pixel circuits;

wherein an input end of the N+1th negative power supply line is arranged on a same side as an input end of the N+1th positive power supply line.

10. The display panel according to claim 9, wherein the display panel is provided with a first area, a second area, and a third area distributed in sequence along the second direction, the input end of the N+1th negative power supply line and the input end of the N+1th positive power supply line are both located in the first area or the third area; the M columns of pixel circuits are located in the second area.

11. The display panel according to claim 10, wherein the N+1th negative power supply line, the N+1th column of pixel circuits, and the N+1th positive power supply line are sequentially arranged along the first direction, or the N+1th positive power supply line, the N+1th column of pixel circuits, and the N+1th negative power supply line are sequentially arranged along the first direction.

12. The display panel according to claim 11, wherein transmission path lengths from the input end of the N+1th negative power supply line and the input end of the N+1th positive power supply line to any pixel circuit in the N+1th column of pixel circuits are equal.

13. The display panel according to claim 9, wherein the Nth negative power supply line, the Nth column of pixel circuits, the Nth positive power supply line, the N+1th negative power supply line, the N+1th column of pixel circuits, and the N+1th positive power supply line are sequentially arranged along the first direction.

14. A display panel, comprising:

M columns of pixel circuits, wherein the M columns of pixel circuits are arranged in sequence along a first direction, each column of the pixel circuits comprises a plurality of pixel circuits arranged in sequence along a second direction, and M is a positive integer;

M negative power supply lines, wherein the M negative power supply lines are arranged in sequence along the first direction, an Nth negative power supply line is located on one side of an Nth column of pixel circuits in the first direction, the Nth negative power supply line is electrically connected to each pixel circuit in the Nth column of pixel circuits, and N is a positive integer less than or equal to M; and M positive power supply lines, wherein the M positive power supply lines are arranged in sequence along the first direction, an Nth positive power supply line is located on another side of the Nth column of pixel circuits in the first direction, the Nth positive power supply line is electrically connected to each pixel circuit in the Nth column of pixel circuits;

wherein an input end of the Nth negative power supply line is arranged opposite to an input end of the Nth positive power supply line;

wherein an N−1th negative power supply line is located on one side of an N−1th column of the pixel circuits in the first direction, and the N−1th negative power supply line is electrically connected to each pixel circuit in the N−1th column of pixel circuits, and N is an even number;

an N−1th positive power supply line is located on another side of the N−1th column of pixel circuits in the first direction, the N−1th positive power supply line is electrically connected to each pixel circuit in the N−1th column of pixel circuits;

wherein an input end of the N−1th negative power supply line is arranged on a same side as an input end of the N−1th positive power supply line.

15. The display panel according to claim 14, wherein the display panel is provided with a first area, a second area, and a third area distributed in sequence along the second direction, one of the input end of the Nth negative power supply line or the input end of the Nth positive power supply line is located in the first area, another of the input end of the Nth negative power supply line and the input end of the Nth positive power supply line is located in the third area, and the M columns of pixel circuits are located in the second area.

16. The display panel according to claim 15, wherein the Nth negative power supply line, the Nth column of pixel circuits, and the Nth positive power supply line are sequentially arranged along the first direction, or the Nth positive power supply line, the Nth column of pixel circuits, and the Nth negative power supply line are sequentially arranged along the first direction.

17. The display panel according to claim 16, wherein transmission path lengths from the input end of the Nth negative power supply line and the input end of the Nth positive power supply line to any pixel circuit in the Nth column of pixel circuits are equal.

* * * * *